United States Patent
Asaba

[11] Patent Number: 5,892,614
[45] Date of Patent: Apr. 6, 1999

[54] OPTICAL PARAMETRIC OSCILLATOR INCLUDING A SATURABLE ABSORBER HAVING A SATURABLE ABSORPTION CHARACTERISTIC

[75] Inventor: Kaoru Asaba, Tokyo, Japan

[73] Assignee: NEC Corporation, Tokyo, Japan

[21] Appl. No.: 823,016

[22] Filed: Mar. 21, 1997

[30] Foreign Application Priority Data

Mar. 22, 1996 [JP] Japan ................................ 8-066067

[51] Int. Cl.⁶ ....................................... G09F 1/39
[52] U.S. Cl. ............................................. 359/330; 372/22
[58] Field of Search .................... 359/326–332; 372/21, 22; 385/122

[56] References Cited

U.S. PATENT DOCUMENTS

| | | | |
|---|---|---|---|
| 3,609,389 | 9/1971 | Bjorkholm ........................ | 359/330 |
| 5,218,609 | 6/1993 | Oda ................................... | 372/22 X |
| 5,317,577 | 5/1994 | Urakami et al. .................. | 372/21 |

FOREIGN PATENT DOCUMENTS

| | | |
|---|---|---|
| 62-189783 | 8/1987 | Japan . |
| 1-276782 | 11/1989 | Japan . |
| 4-15969 | 1/1992 | Japan . |
| 6-88979 | 3/1994 | Japan . |
| 6-164048 | 10/1994 | Japan . |
| 8-316557 | 11/1996 | Japan . |

OTHER PUBLICATIONS

Japanese Office Action dated Jun. 2, 1998 with English language translation of Japanese Examiner's comments.

*Primary Examiner*—John D. Lee
*Attorney, Agent, or Firm*—Whitham, Curtis & Whitham

[57] ABSTRACT

In an optical parametric oscillator including a laser medium (3) for producing a fundamental wave, a pair of optical elements (4 and 8) constituting a resonator exhibiting resonance for the fundamental wave, and a nonlinear optical crystal (7) between the optical elements for carrying out wavelength-conversion on the fundamental wave to produce a wavelength-converted wave so that one (8) of the optical elements transmits the wavelength-converted wave as an oscillator output wave, a saturable absorber (10) is located between the optical elements. The saturable absorber has a saturable absorption characteristic for the fundamental wave to allow transmission of the fundamental wave of a higher intensity higher than a predetermined intensity and to disallow transmission of the fundamental wave of a lower intensity hot higher than the predetermined intensity. The saturable absorber exhibits a decreased absorption coefficient at the higher intensity of the fundamental wave to allow transmission of the fundamental wave of the higher intensity without absorbing the fundamental wave of the higher intensity and an increased absorption coefficient at the lower intensity of the fundamental wave to disallow transmission of the fundamental wave of the lower intensity by absorbing the fundamental wave of the lower intensity.

9 Claims, 2 Drawing Sheets

OPTICAL PARAMETRIC OSCILLATOR INCLUDING A SATURABLE ABSORBER HAVING A SATURABLE ABSORPTION CHARACTERISTIC

BACKGROUND OF THE INVENTION

This invention relates to an optical parametric oscillator using a nonlinear optical crystal.

An optical parametric oscillator of the type described, generally includes a laser medium for producing a fundamental wave of a fundamental wavelength. A pair of optical elements are opposed to each other with the laser medium interposed therebetween. The optical elements constitute a resonator exhibiting resonance for the fundamental wave. Located between the optical elements, a nonlinear optical crystal carries out wavelength-conversion on the the fundamental wave to produce a wavelength-converted wave of a converted wavelength so that one of the optical elements transmits the wavelength-converted wave as an oscillator output wave.

A conventional optical parametric oscillator is disclosed in Japanese Unexamined Patent Publication No. 164048/1994. As will later be described, the conventional optical parametric oscillator is incapable of achieving a high-efficiency wavelength conversion because it is impossible to suppress undesirable succeeding oscillation of the wavelength-converted wave which oscillation inevitably occurs due to oscillation of the fundamental wave of a lower intensity after main oscillation of the wavelength-converted wave occurs due to oscillation of the fundamental wave of a higher intensity.

SUMMARY OF THE INVENTION

It is therefore an object of this invention to provide an optical parametric oscillator which is capable of achieving a high-efficiency wavelength conversion.

It is another object of this invention to provide an optical parametric oscillator of the type described, which can suppress undesirable succeeding oscillation of a wavelength-converted wave due to oscillation of the fundamental wave of a lower intensity.

Other objects of this invention will become clear as the description proceeds.

An optical parametric oscillator to which this invention is applicable includes a laser medium for producing a fundamental wave, a pair of optical elements which are opposed to each other with the laser medium interposed therebetween and which constitute a resonator exhibiting resonance for the fundamental wave, and a nonlinear optical crystal between the optical elements for carrying out wavelength-conversion on the the fundamental wave to produce a wavelength-converted wave so that a particular one of the optical elements transmits the wavelength-converted wave as an oscillator output wave.

According to this invention, the optical parametric oscillator comprises: a saturable absorber located between the optical elements and having a saturable absorption characteristic for the fundamental wave to allow transmission of the fundamental wave of a higher intensity higher than a predetermined intensity and to disallow transmission of the fundamental wave of a lower intensity not higher than the predetermined intensity.

Typically, the saturable absorber exhibits a decreased absorption coefficient at the higher intensity of the fundamental wave to allow transmission of the fundamental wave of the higher intensity without absorbing the fundamental wave of the higher intensity and an increased absorption coefficient at the lower intensity of the fundamental wave to disallow transmission of the fundamental wave of the lower intensity by absorbing the fundamental wave of the lower intensity.

DESCRIPTION OF THE PREFERRED EMBODIMENT

Figure 1:
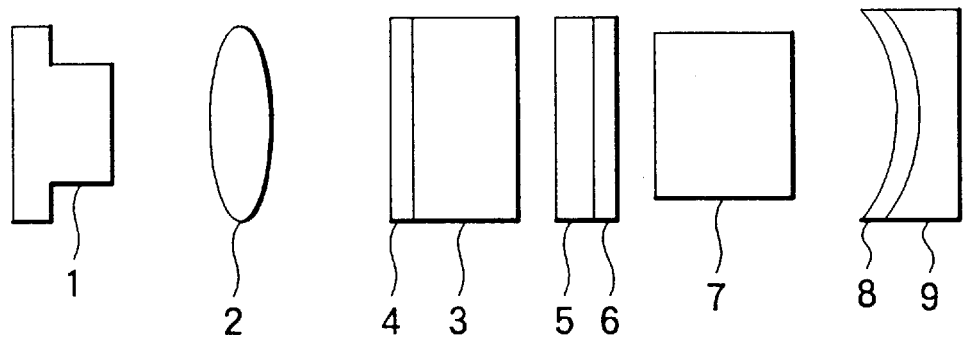
FIG. 1 is a view showing a basic structure of a conventional optical parametric oscillator.

Referring to FIG. 1, a conventional optical parametric oscillator will first be described for a better understanding of this invention. The optical parametric oscillator is equivalent to the conventional optical parametric oscillator described in the preamble of the instant specification.

In FIG. 1, the optical parametric oscillator is a wavelength-conversion laser oscillator of an internal resonator type. An excitation light beam is emitted from a laser diode 1 as an excitation light source, passes through a condenser lens 2 and a wavelength-selective optical film 4 which allows transmission of the excitation light beam and has a high reflectance for a fundamental wave oscillated by a solid-state laser crystal 3, and is condensed to the solid-state laser crystal 3. The solid-state laser crystal 3 is excited by the excitation light beam from the laser diode 1 to start oscillation between the wavelength-selective optical film 4 and a wavelength-selective resonant concave surface 9 at a fundamental wavelength determined by the solid-state laser crystal 3. A fundamental wave laser beam thus oscillated passes through a nonlinear optical crystal 7 to be partly subjected to wavelength conversion. In the example described in the above-referred Japanese Unexamined Patent Publication No. 164048/1994, a secondary harmonic wave is obtained by the wavelength conversion. Oscillation of the secondary harmonic wave produced by the wavelength conversion is started between a wavelength-selective resonant mirror 5 with a wavelength-selective optical film 6 deposited thereon by vapor deposition and having a wavelength characteristic of no reflection for the fundamental wave and total internal reflection for the secondary harmonic wave, and the wavelength-selective resonant concave surface 9 with a wavelength-selective optical film 8 deposited thereon by vapor deposition and having a wavelength characteristic of total internal reflection for the fundamental wave and partial transmission for the secondary harmonic wave. The secondary harmonic wave is emitted from the wavelength selective resonant concave surface 9 to the outside of the laser oscillator.

Thus, simultaneous oscillation of the wavelength-converted laser beam obtained by the wavelength conversion and the fundamental wave is carried out by the use of the same resonator for the purpose of achieving high-efficiency and high-power wavelength conversion. In this case, however, the oscillation of the wavelength-converted laser beam brings about an optical loss within the resonator with respect to the fundamental wave laser beam. This results in a problem that, simultaneously with the oscillation of the wavelength-converted laser beam of high power, the oscillation of the fundamental wave is interfered to become unstable or to be stopped. As a consequence of such unstable oscillation of the fundamental wave, the power of the wavelength-converted laser beam becomes unstable also.

Particularly, consideration will be made about the laser oscillation for pulse oscillation. When the oscillation of the wavelength-converted laser beam is started, the oscillation of the fundamental wave is interfered and the wavelength conversion is stopped. Thereafter, when the oscillation of the fundamental wave is restarted by residual excitation energy remaining in the solid-state laser medium, the wavelength conversion is restarted to again interfere the oscillation of the fundamental wave. As a result, the wavelength-converted laser beam obtained by first pulse oscillation of the fundamental wave is temporally followed by production of a pulse train of a plurality of pulses of the wavelength-converted laser beam. In case of high output power, it is difficult to simultaneously achieve high-efficiency wavelength conversion, stable power of the wavelength-converted laser beam, and pulse oscillation in a single pulse.

Taking the above-mentioned problem into consideration, this invention provides a pulsed laser optical parametric oscillator which is capable of simultaneously achieving high-efficiency wavelength conversion and high-power single pulse oscillation by an internal resonator.

Figure 2:
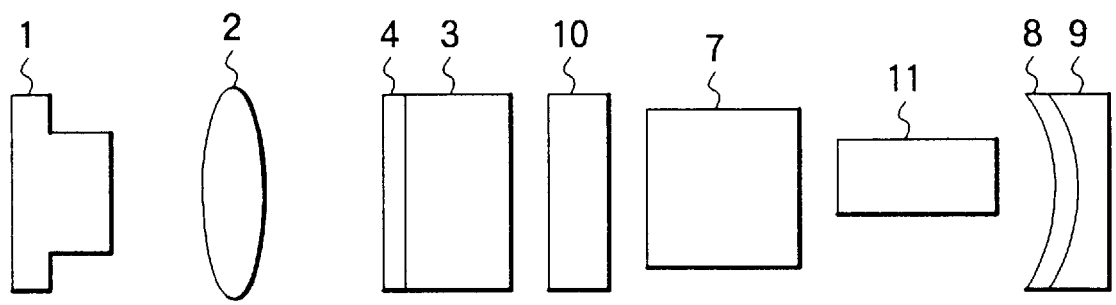
FIG. 2 is a view showing a basic structure of an optical parametric oscillator according to an embodiment of this invention.

Turning to FIG. 2, description will be made about an optical parametric oscillator according to an embodiment of this invention. In FIG. 2, a reference numeral 1 represents an excitation laser diode, 2, a condenser lens, 3, a solid-state laser crystal for producing a fundamental wave, and 4, a dielectric multilayer film (a wavelength-selective optical film) which is deposited by vapor deposition on a laser-diode-side surface of the solid-state laser crystal 3 and which has a wavelength characteristic of total internal reflection for the fundamental wave and a wavelength-converted light beam and no reflection for a laser beam produced by the excitation laser diode. Another dielectric multilayer film (another wavelength-selective optical film) 8 is deposited by vapor deposition on a wavelength selective resonant concave surface 9 of a concave mirror and has a wavelength characteristic of total internal reflection for the fundamental wave and partial transmission of the wavelength-converted light beam. A nonlinear optical crystal 7 is for wavelength conversion of the fundamental wave. A saturable absorber 10 is of a nonlinear material which exhibits a saturable absorption characteristic for the fundamental wave. A Q-switch element 11 is for controlling an optical loss within the laser oscillator in response to an external input signal.

Next, the operation will be described. In FIG. 2, an excitation light beam is emitted from the laser diode 1 as an excitation light source, passes through the condenser lens 2 and the wavelength-selective optical film 4 which allows transmission of the excitation light beam and has a high reflectance for the fundamental wave oscillated by the solid-state laser crystal 3, and is condensed to the solid-state laser crystal 3. The solid-state laser crystal 3 is excited by the excitation light beam from the laser diode to start oscillation between the wavelength-selective optical film 4 and the wavelength-selective resonant concave surface 9 at a fundamental wavelength determined by the solid-state laser crystal 3. A fundamental wave laser beam thus oscillated passes through the nonlinear optical crystal 7 to be partly subjected to wavelength conversion. Oscillation of a resultant wavelength-converted laser beam is started between the wavelength-selective optical film 4 having the wavelength characteristic of total internal reflection for the fundamental wave and the wavelength-converted light beam, and the wavelength-selective resonant concave surface 9 with the wavelength-selective optical film 8 deposited thereon by vapor deposition and having the wavelength characteristic of total internal reflection for the fundamental wave and partial transmission for the wavelength-converted light beam. The wavelength-converted light beam is emitted from the wavelength-selective resonant concave surface 9 to the outside of the laser oscillator.

Figure 3:
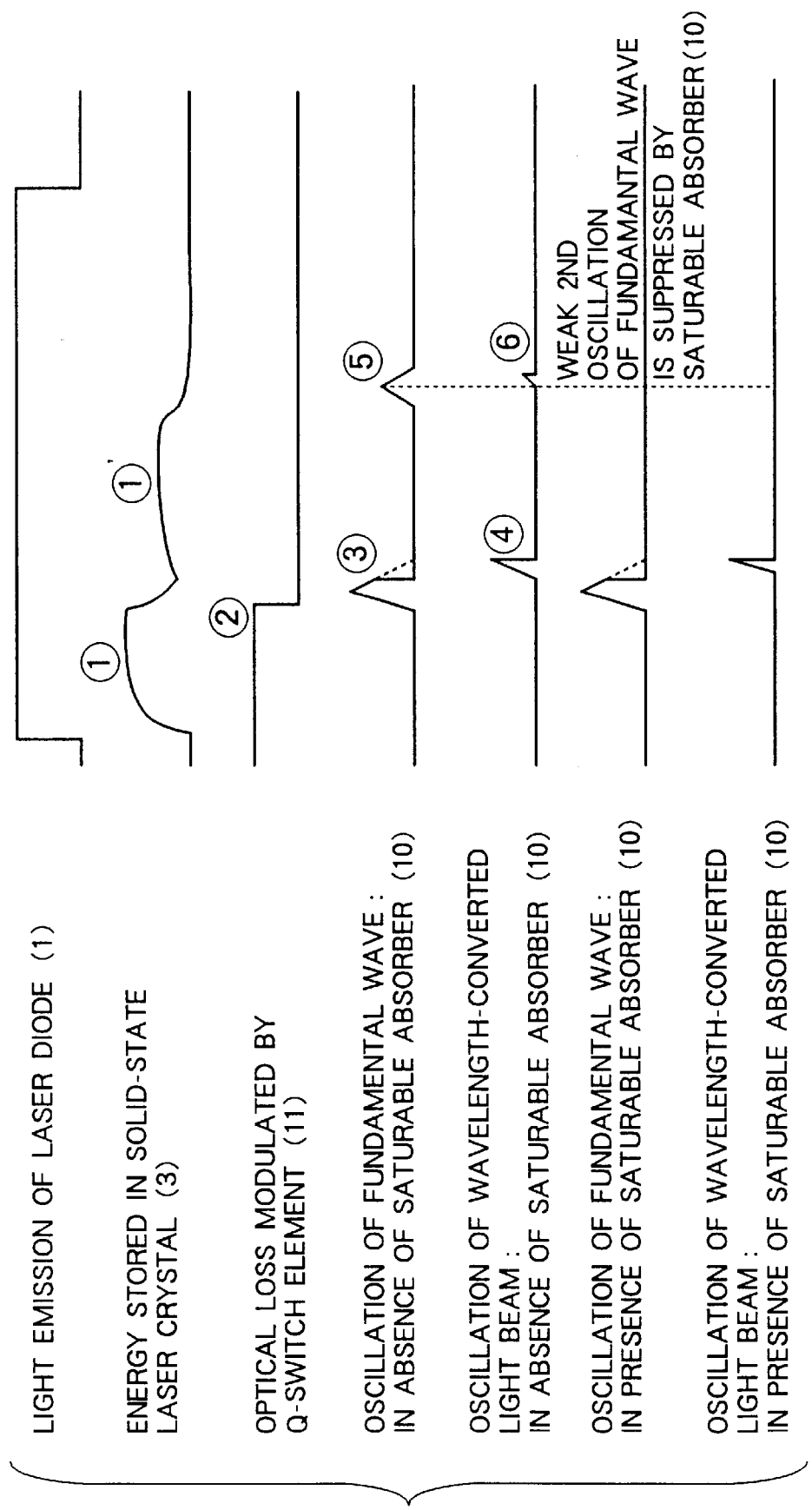
FIG. 3 is a view for use in describing operation of the optical parametric oscillators illustrated in FIGS. 1 and 2.

Referring to FIG. 3, the operation of pulse oscillation by the oscillator of FIG. 2, including the functions of the saturable absorber 10 and the Q-switch element 11, will be described in comparison with the prior art. The laser diode 1 performs light emission so that energy is stored in the solid-state laser crystal 3. In the meantime, the Q-switch element 11 increases an optical loss within the laser oscillator to a level such that laser oscillation is suppressed. At the time instant when a sufficient level of energy is stored in the solid state laser crystal 3 (①), the Q-switch element 11 changes its modulation to drastically decrease the optical loss within the laser oscillator down to 0 (②). Then, the energy stored in the solid-state laser crystal 3 is released in a pulsed fashion so that the laser oscillator starts the pulse oscillation (③). The fundamental wave starting the pulse oscillation is subjected to wavelength conversion by the nonlinear optical crystal 7 (④). Following oscillation of the wavelength-converted light beam, the energy of the fundamental wave is transferred to the wavelength-converted light beam so that the oscillation of the fundamental wave is suppressed and stopped. Simultaneously, the oscillation of the wavelength-converted light beam is stopped.

In this state, a part of the energy is still kept stored in the solid-state laser crystal 3 (①') in the oscillator of FIG. 1 so that weak oscillation of the fundamental wave is started again (⑤). Simultaneously, the oscillation of the wavelength-converted light beam is started again (⑥). As a consequence, the laser oscillator produces a plurality of pulses of the wavelength-converted light beam (④, ⑥).

On the other hand, in the oscillator of FIG. 2, the saturable absorber 10 serves to suppress the second oscillation (⑤) of the fundamental wave. Therefore, the wavelength-converted light beam (⑥) is not produced so that the oscillation of the wavelength-converted light beam is performed as a single pulse. The first oscillation of the fundamental wave produces a high-power pulse because the energy stored in the solid-state laser crystal 3 is great (①). For such laser beam, absorption by the saturable absorber 10 is saturated and approaches zero absorption coefficient so that the first oscillation is not affected at all. Upon the second oscillation of the fundamental wave, the energy stored in the solid-state laser crystal 3 is small (①'). Therefore, the second oscillation of the fundamental wave occurs as weak pulse oscillation (⑤). For such laser beam, absorption by the saturable absorber 10 is not saturated and exhibits high absorption coefficient. Thus, the second oscillation (⑤) of the fundamental wave is suppressed such that the second oscillation (⑥) of the wavelength-converted light beam does not occur.

In this invention, the saturable absorber having such saturable absorption characteristic for the fundamental wave is arranged inside of the internal resonator. With this structure, it is possible to suppress the second pulse oscillation which is undesirable for the pulsed laser oscillator.

Therefore, according to this invention, high-efficiency pulse-type wavelength conversion by the internal resonator can be achieved by high-power single pulse oscillation.

Summarizing in FIGS. 2 and 3, the optical parametric oscillator includes a laser medium (3) for producing a fundamental wave of a fundamental wavelength. A pair of optical elements (4 and 8) are opposed to each other with the laser medium interposed therebetween and which constitute a resonator exhibiting resonance for the fundamental wave. A nonlinear optical crystal (7) is located between the optical elements and carries out wavelength-conversion on the the fundamental wave to produce a wavelength-converted wave of a converted wavelength so that a plurality one (8) of the optical elements transmits as an oscillator output wave.

A saturable absorber (10) is located between the optical elements and having a saturable absorption characteristic for the fundamental wave to allow transmission of the fundamental wave (③) of a higher intensity higher than a predetermined intensity and to disallow transmission of the fundamental wave ((5)) of a lower intensity not higher than the predetermined intensity.

The saturable absorber exhibits a decreased absorption coefficient at the higher intensity of the fundamental wave to allow transmission of the fundamental wave of the higher intensity without absorbing the fundamental wave of the higher intensity and an increased absorption coefficient at the lower intensity of the fundamental wave to disallow transmission of the fundamental wave of the lower intensity by absorbing the fundamental wave of the lower intensity.

The wavelength-converted wave may be a harmonic wave with respect to the fundamental wave.

An excitation source (1) is located outside the resonator for producing an excitation light beam for use in exciting the laser medium to make the laser medium produce the fundamental wave.

More specifically, the excitation source is located outside the resonator and near a different one (4) of the optical elements for producing the excitation light beam which is transmitted by the different one of the optical elements and is supplied to the laser medium to excite the laser medium and to thereby make the laser medium produce the fundamental wave.

Preferably, the nonlinear optical crystal is located between the laser medium and the particular one of the optical elements. In this event, the saturable absorber is located between the laser medium and the nonlinear optical crystal.

In this case, a Q-switch element (11) is located between the nonlinear optical crystal and the particular one of the optical elements.

What is claimed is:

1. An optical parametric oscillator comprising:
   a laser medium;
   a pair of optical elements which are opposed to each other with said laser medium interposed therebetween;
   Q-switch element between said pair of optical elements;
   a nonlinear optical crystal between said optical elements, said laser medium producing, in cooperation with said Q-switch element, first oscillation of a fundamental wave of a higher intensity and second oscillation of the fundamental wave of a lower intensity lower than said high intensity subsequent to said first oscillation of the fundamental wave, said optical elements constituting a resonator exhibiting resonance for said fundamental wave, said non-linear crystal for carrying out wavelength-conversion on said fundamental wave to produce a wavelength-converted wave so that a particular one of said optical elements transmits said wavelength-converted wave as an oscillator output wave; and
   a saturable absorber located between said pair of optical elements and having a saturable absorption characteristic for said fundamental wave to allow transmission of said first oscillation of the fundamental wave of said higher intensity and to disallow transmission of said second oscillation of the fundamental wave of said lower intensity.

2. An optical parametric oscillator as claimed in claim 1, wherein said saturable absorber exhibits a decreased absorption coefficient at said higher intensity of the fundamental wave to allow transmission of said first oscillation of the fundamental wave of said higher intensity without absorbing the fundamental wave of said higher intensity and an increased absorption coefficient at said lower intensity of the fundamental wave to disallow transmission of said second oscillation of the fundamental wave of said lower intensity by absorbing the fundamental wave of said lower intensity.

3. An optical parametric oscillator as claimed in claim 1, wherein said wavelength-converted wave is a harmonic wave with respect to said fundamental wave.

4. An optical parametric oscillator as claimed in claim 1, wherein said optical parametric oscillator further comprises an excitation source located outside said resonator for producing an excitation light beam for use in exciting said laser medium to make said laser medium produce, in cooperation with Q-switch element, the first and the second oscillation of said fundamental wave.

5. An optical parametric oscillator as claimed in claim 4, wherein said excitation source is located outside said resonator and near a different one of said optical elements for producing said excitation light beam which is transmitted by said different one of the optical elements and is supplied to said laser medium to excite said laser medium and to thereby make said laser medium produce, in cooperation with said Q-switch element, the first and the second oscillation of said fundamental wave.

6. An optical parametric oscillator as claimed in claim 1, said nonlinear optical crystal being located between said laser medium and said particular one of the optical elements, said Q-switch element being located between said non-linear crystal and said particular one of the optical elements, wherein said saturable absorber is located between said laser medium and said nonlinear optical crystal.

7. An optical parametric oscillator, comprising:
   a laser diode;
   a condenser lens in series with said laser diode;
   a solid-state laser crystal having a first wavelength selective optical film thereon in series with said condenser lens;
   a saturable absorber in series with said solid-state laser crystal;
   a non-linear optical crystal in series with said saturable absorber;
   a Q-switch in series with said non-linear optical crystal; and
   a concave mirror having a second wavelength selective optical film thereon in series with said Q-switch,
   wherein said laser diode produces in cooperation with said Q-switch, a first oscillation of a fundamental wave of a higher intensity and second oscillation of the fundamental wave of a lower intensity subsequent to said first oscillation of the fundamental wave, said first and second wavelength selective films comprising a resonator exhibiting resonance for said fundamental wave, said non-linear crystal for carrying out wavelength-conversion on said fundamental wave to produce a wavelength-converted wave so that a particular one of said optical elements transmits said wavelength-converted wave as an oscillator output wave,
   and wherein said saturable absorber has a saturable absorption characteristic for said fundamental wave to allow transmission of said first oscillation of the fundamental wave of said higher intensity and to disallow transmission of said second oscillation of the fundamental wave of said lower intensity.

8. An optical parametric oscillator as recited in claim 7 wherein said Q-switch element operates in response to an external signal.

9. An optical parametric oscillator as recited in claim 7 wherein said second wavelength selective film comprises a multi-layer dielectric.

* * * * *